Oct. 19, 1926.
J. P. OWENS
1,603,493
INSECT DESTROYING MACHINE
Filed July 6, 1923    2 Sheets—Sheet 1
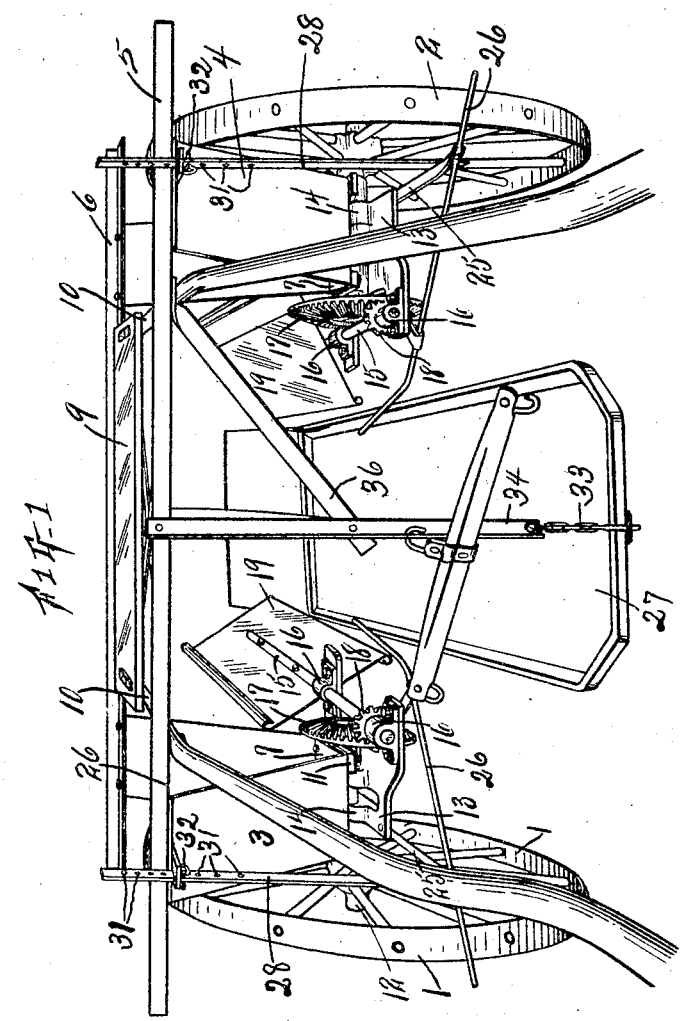
Inventor
JAMES P. OWENS.
By A. L. Jackson
Attorney

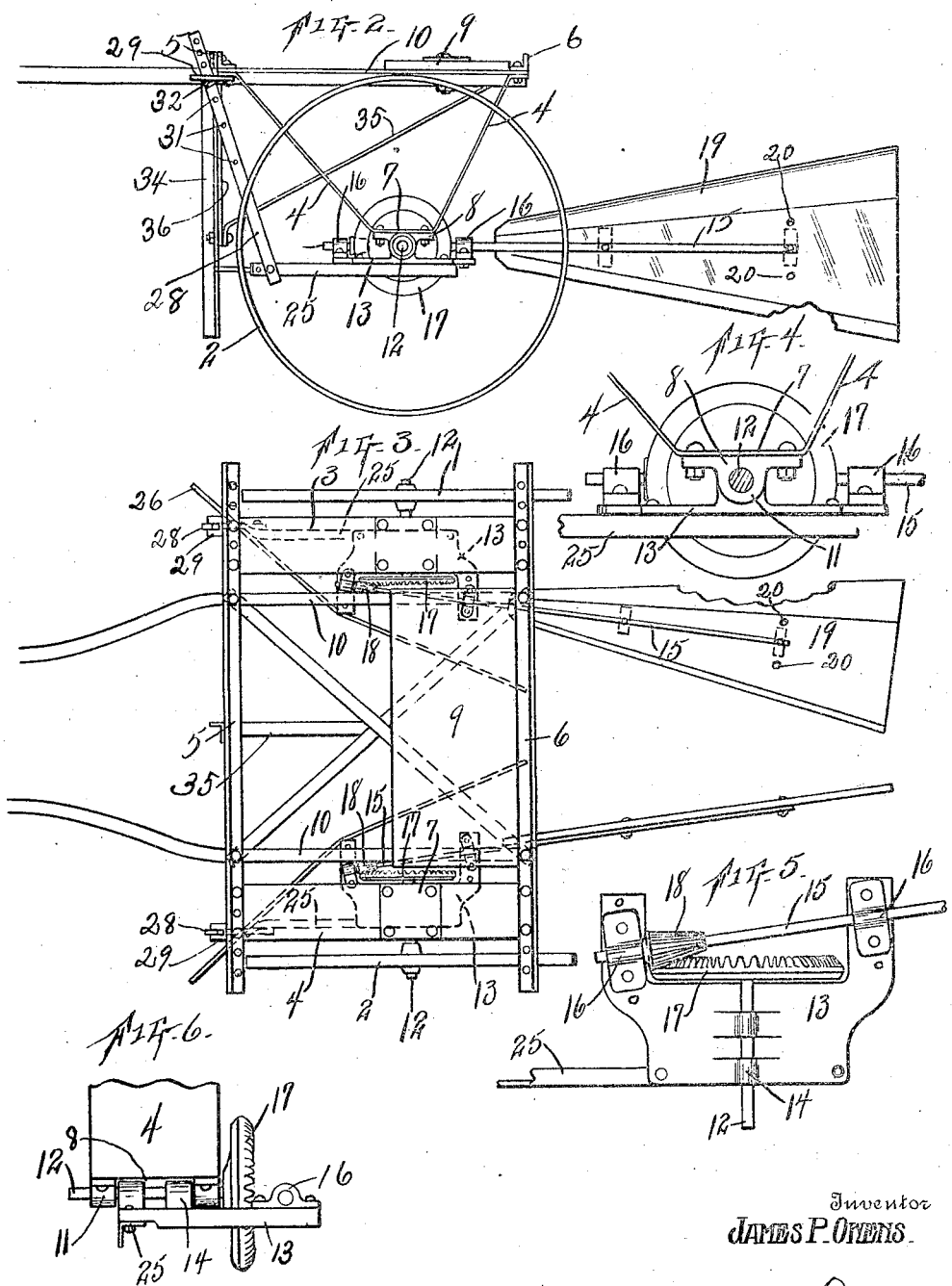

Patented Oct. 19, 1926.

1,603,493

UNITED STATES PATENT OFFICE.

JAMES P. OWENS, OF WEATHERFORD, TEXAS.

INSECT-DESTROYING MACHINE.

Application filed July 6, 1923. Serial No. 649,868.

My invention relates to improvements in insect destroying machines and more particularly to machines for catching insects from growing plants and for gathering punctured or stung bolls and squares which contain the eggs and larvæ of boll weevils; and the object is to provide a simple device which will be highly efficient in accomplishing the work of catching the boll weevils and gathering the bolls and squares. It is well known that when a young boll or square is punctured by the boll weevils for the purpose of depositing the eggs, the bolls and squares wilt and become loose or weak on the stems and are easily shaken down and that destroying such squares and bolls is an effectual method of destroying the boll weevils. Another object is to provide a boll weevil catching machine which can be furnished to farmers at small cost. Other objects and advantages will be fully explained in the following description and the invention will be more particularly pointed out in the claims.

Reference is had to the accompanying drawings which form a part of this application.

Fig. 1 is a perspective front view of the machine. Fig. 2 is a side elevation of the same. Fig. 3 is a plan view. Fig. 4 is a side elevation of the bearing member on one side. Fig. 5 is a detail plan view of the same. Fig. 6 is a rear elevation of the left master gear wheel and its connections.

Similar characters of reference are used to indicate the same parts throughout the several views.

This machine is provided with a wheeled truck, having supporting and driving wheels 1 and 2 which are driven by friction against the earth. The machine is provided with a frame having two sheet metal members 3 and 4 which are attached to and support the front and rear cross bars 5 and 6. The angular members 3 and 4 have horizontal portions 7 which are attached to the bearing members 8. The transverse members 5 and 6 are braced by the longitudinal bars 10. The machine is thus provided with a rigid frame. A seat 9 is mounted on the frame members 10. The bearing members 8 are the upper bearing members.

The upper bearing members 8 have bearings 11 projecting from the underside thereof. The shafts or axles 12 are rigid with the wheels 1 and 2 and are journaled in the bearings 11. This makes a pivotal support for the frame above described. Sub-bearing members 13 are provided with bearings 14 which project upwardly from the members 13 and engage the shafts 12. The shafts 15 for the agitators are mounted on the sub-bearing members 13 and journaled in bearings 16 on the members 13. Master bevel gear wheeels 17 are rigid with shafts 12 and are thus driven by the wheels 1 and 2. Bevel pinions 18 are rigid with the shafts 15 and are driven by the master gear wheels 17. The bearings 16 for shafts 15 are adjustable laterally on the sub-bearing members 13 so that the agitator shafts 15 may be set at different angles. The agitators 19 are wider at one end than the other and are pivotally connected at their ends to the shafts 15 and are provided with a plurality of holes 20 so that the agitators can be set at different angles by moving the attaching bolts to different holes in the bearing supports 13 on the shafts. The agitators 19 are flat pieces of sheet metal which are bolted to the shafts 15 and the blades or agitators taper from the rear end forward so that the agitators will more easily pass through the cotton stalks. By reason of pivotal connection of the sub-bearing members 13 with the shafts 12, these bearing members can be turned to different positions to vary the positions of the agitators 19 and the pinions 18 will be driven by the master gear wheels 17 at whatever angle the shafts 15 may be turned. The object is to adapt the machine for agitating the upper parts of high cotton stalks. By thus providing a wide range of positioning the agitators 19, the machine is adaptable for low cotton stalks or high cotton stalks.

The machine is provided with deflectors 26 which incline the cotton stalks over the pan 27 in front of the truck and backwardly. The stalks must be brought to positions over the pan before they are agitated by the paddles or agitators 19.

In operation the normal position of the bearing member 8 is horizontal. Provision is made for operating the machine with the bearing members 13 set at any required angle to make the paddles 19 strike the stalks of cotton whether the stalks are high or low. By reason of the pivotal connection of the members 13 through bearings 14 and shafts 12, the members 13 can be set at any required angle. Means are provided for holding these members 13 at different angles relative to the bearing members 8 and the horizontal frame of the machine. Bars 25 are attached to the members 13 (see Figs. 2 and 6) and project forwardly. Gaging bars 28 are pivotally connected to the bars 25 and extended upwardly through keepers 29 which are attached to the frame members 3 and 4. The weight of the paddles tends to press the gaging bars 28 upwardly all the time. To hold the paddles 19 at the required elevation, the bars 28 are provided with pluralities of holes 31 and pins 32 are placed in the holes and against the under sides of the keepers 29. The pins 32 and their connections hold the ends of the bars 25 and the shafts 15 of the paddles at any required angle. The gathering pan 27 is dragged between the wheels of the truck by a chain 33 which is attached to the pan and to the hanger 34 which is attached to the frame member 5 and made rigid therewith by braces 35 and 36.

The paddles or agitators 19 are reversible on their shafts 15 for the purpose of adapting the machine for use with low and high stalks. The blades 19 are reversed by removing the attaching bolts and changing ends of the blades and attaching them to a shaft 15 with the same bolts. This provision together with the provision for changing the angles of the shafts 15 adapts the machine for operating on low cotton stalks or high cotton stalks. In operation, turn the narrow ends of the paddles to the rear and lower the paddles for low cotton stalks. Turn the wide ends of the paddles forward and raise the paddles for high cotton stalks. The wide ends of the paddles strike the tops of the high cotton stalks by reason of the greater diameter through which the wide ends turn.

What I claim, is—

1. An insect gathering machine comprising a wheeled truck having a rigid carrying frame provided with bearings, stub shafts journaled in said bearings and driven by said truck, operating frames provided with bearings engaging said shafts, said bearings constituting the means for pivotally connecting said operating frames to said carrying frame, a gathering pan carried by said truck, actuating means driven by said shaft for shaking insects, bolls and squares from growing plants into said pan, and means carried by said carrying frame for holding said operating frames at different operating positions.

2. An insect gathering machine comprising a wheeled truck, having a rigid carrying frame provided with bearings, stub shafts journaled in said bearings and driven by said truck, operating frames provided with bearings engaging said shafts, said bearings constituting the means for pivotally connecting said operating frames to said carrying frame, a gathering pan carried by said truck, actuating means driven by said shaft for shaking insects, bolls and squares from growing plants into said pan, and means carried by said carrying frame for holding said operating frames at different operating positions, consisting of keepers attached to said carrying frame, positioning bars attached to said operating frames, and gage link bars pivotally connected to said positioning bars and operatively engaging said keepers.

3. An insect gathering machine comprising a wheeled truck including stub shafts journaled therein, operating frames provided with bearings engaging said shafts, for pivotally connecting the operating frames to said truck, a gathering pan dragged by said truck, agitator shafts journaled on said operating frames and driven by said truck, means for positioning said operating frames for holding said agitator shafts at different angles vertically, gearing for driving said agitator shafts at any required angle, and tapered agitator paddles detachably connected to said agitator shafts and reversible thereon for the purposes set forth.

In testimony whereof, I set my hand, this 24th day of April, 1923.

JAMES P. OWENS.